United States Patent
Gibbs et al.

(10) Patent No.: US 12,145,648 B2
(45) Date of Patent: Nov. 19, 2024

(54) ACTUATOR LEADSCREW ASSEMBLY FOR STEERING COLUMN

(71) Applicant: Steering Solutions IP Holding Corporation, Saginaw, MI (US)

(72) Inventors: Christopher W. Gibbs, Saginaw, MI (US); James E. Rouleau, Burt, MI (US); Harmony J. Hudnall, Montrose, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/348,046

(22) Filed: Jul. 6, 2023

(65) Prior Publication Data
US 2023/0356767 A1    Nov. 9, 2023

Related U.S. Application Data

(62) Division of application No. 16/912,674, filed on Jun. 25, 2020, now Pat. No. 11,718,340.

(60) Provisional application No. 62/894,225, filed on Aug. 30, 2019.

(51) Int. Cl.
| | |
|---|---|
| *F16H 25/24* | (2006.01) |
| *B62D 1/185* | (2006.01) |
| *B62D 1/187* | (2006.01) |
| *F16C 17/02* | (2006.01) |

(52) U.S. Cl.
CPC .............. *B62D 1/185* (2013.01); *B62D 1/187* (2013.01); *F16C 17/02* (2013.01); *F16H 25/24* (2013.01)

(58) Field of Classification Search
CPC .. F16H 25/24; B62D 3/04; B62D 3/06; B62D 3/08
See application file for complete search history.

(56) References Cited

U.S. PATENT DOCUMENTS

| | | | | |
|---|---|---|---|---|
| 4,810,108 A | * | 3/1989 | Yajima | F16C 35/12 384/488 |
| 5,509,198 A | * | 4/1996 | Takamizawa | F16C 25/06 |
| 7,051,612 B2 | * | 5/2006 | Green | B62D 1/195 74/493 |
| 2005/0041898 A1 | * | 2/2005 | Yamada | G01H 13/00 384/490 |

(Continued)

FOREIGN PATENT DOCUMENTS

| | | | | |
|---|---|---|---|---|
| JP | 2001304253 A | * | 10/2001 | F16C 35/06 |
| JP | 5786731 B2 | * | 9/2015 | |

OTHER PUBLICATIONS

EPO Machine Translation of the Description of JP 2001304253 A, Yoshimoto et al., Oct. 31, 2001. (Year: 2024).*

(Continued)

*Primary Examiner* — Daniel D Yabut
(74) *Attorney, Agent, or Firm* — Dickinson Wright PLLC

(57) ABSTRACT

An actuator leadscrew assembly is provided. The assembly includes a leadscrew shaft extending longitudinally. The assembly also includes a first bearing pressed over the leadscrew shaft. The assembly further includes a housing pressed over the leadscrew shaft and in abutment with the first bearing. The assembly yet further includes a second bearing pressed over the leadscrew shaft and in abutment with the housing. The assembly also includes a retaining ring disposed over the leadscrew shaft retaining the second bearing.

12 Claims, 1 Drawing Sheet

(56) References Cited

U.S. PATENT DOCUMENTS

2019/0185054 A1* 6/2019 Oh ..................... F16F 1/445

OTHER PUBLICATIONS

EPO Machine Translation of the Description of JP 5786731 B2, Sep. 30, 2015. (Year: 2024).*

* cited by examiner

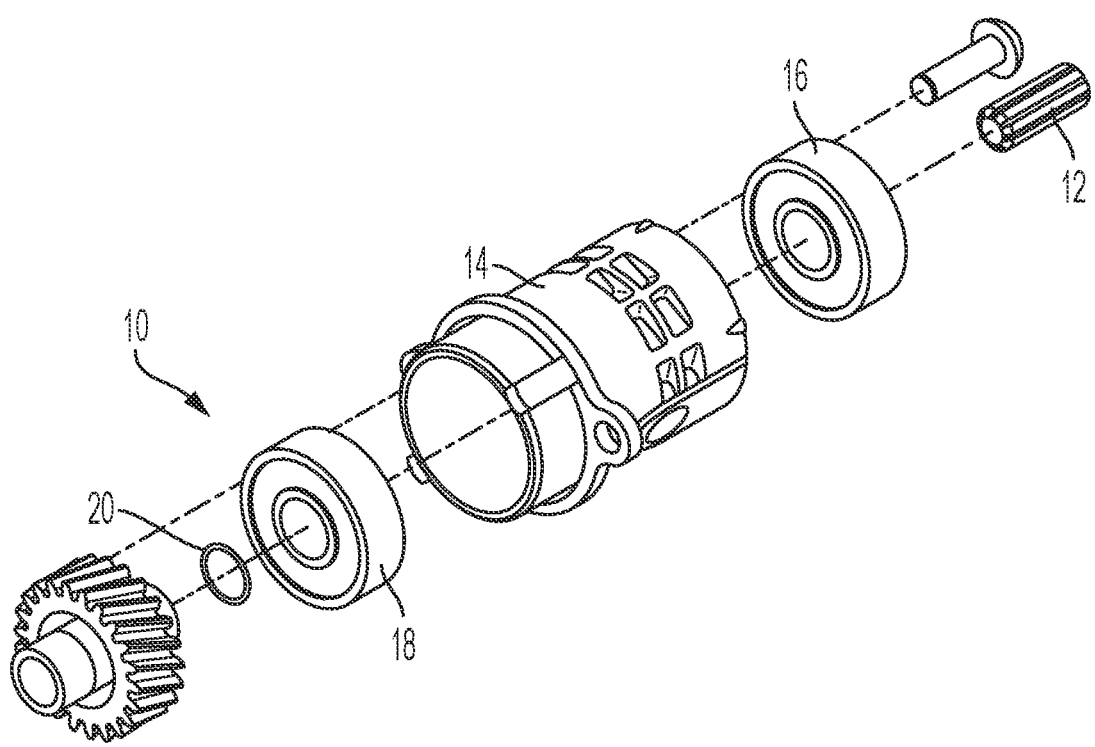

ACTUATOR LEADSCREW ASSEMBLY FOR STEERING COLUMN

CROSS-REFERENCE TO RELATED APPLICATION

This application is a divisional application of U.S. patent application Ser. No. 16/912,674, filed Jun. 25, 2020, which claims the benefit of priority to U.S. Patent Application Ser. No. 62/894,225, filed Aug. 30, 2019, the entire disclosures of which are each incorporated by reference herein.

BACKGROUND

The following description relates to steering column assemblies and, more particularly, to an actuator leadscrew assembly.

Current electrically powered rake and telescope leadscrew assembly designs include multiple components and require torque and press operations to assemble. A bearing preload is controlled using a spring element and a nut that is torqued down to full compression and then backed off to achieve the desired system preload. The torque nut is then staked to lock the position. This resulting preload can be close to the maximum working loads and is often apparent in the steering column stiffness measurement. The nut provides overload strength during a crash event. It is common for the rake actuator to be placed in high tensile loads during a crash event. This tensile load will compress the spring element and transfer the load to the nut. The strength of the nut and thread prevents unwanted steering column motion.

The assembly process is susceptible to variation of preload from the torque and back-off process capability. The staking process may introduce high loading into the lead screw which can cause bending. The resulting runout can lead to increased audible noise fluctuation. The spring element provides a lack of stiffness when the system is loaded in one direction, such that the stiffness is not uniform in each direction. The nut performs multiple functions (e.g., adjustment and retention) and therefore is more complex than other solutions.

SUMMARY OF THE INVENTION

According to one aspect of the disclosure, an actuator leadscrew assembly is provided. The assembly includes a leadscrew shaft extending longitudinally. The assembly also includes a first bearing pressed over the leadscrew shaft. The assembly further includes a housing pressed over the leadscrew shaft and in abutment with the first bearing. The assembly yet further includes a second bearing pressed over the leadscrew shaft and in abutment with the housing. The assembly also includes a retaining ring disposed over the leadscrew shaft retaining the second bearing.

According to another aspect of the disclosure, a method of assembling an actuator leadscrew assembly is provided. The method includes pressing a first bearing on to and over a leadscrew shaft. The method also includes pressing a housing over the leadscrew shaft and into abutment with the first bearing. The method further includes pressing a second bearing over the leadscrew shaft and into abutment with the housing. The method yet further includes disposing a retaining ring over the leadscrew shaft to retain the second bearing.

According to another aspect of the disclosure, a vehicle steering column assembly includes a steering column adjustment system. The vehicle steering column assembly also includes an actuator leadscrew assembly. The actuator leadscrew assembly includes a leadscrew shaft extending longitudinally. The actuator leadscrew assembly also includes a first bearing pressed over the leadscrew shaft. The actuator leadscrew assembly further includes a housing pressed over the leadscrew shaft and in abutment with the first bearing. The actuator leadscrew assembly yet further includes a second bearing pressed over the leadscrew shaft and in abutment with the housing. The actuator leadscrew assembly also includes a retaining ring disposed over the leadscrew shaft retaining the second bearing, wherein the actuator leadscrew assembly does not include a nut coupled to the leadscrew.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawing in which:

FIG. 1 is perspective, disassembled view of an actuator leadscrew assembly.

DETAILED DESCRIPTION

Referring now to the FIGURE, where the invention will be described with reference to specific embodiments, without limiting same, an actuator leadscrew assembly 10 is disclosed. While described herein as being part of a vehicle steering column adjustment assembly, it is to be understood that other applications may benefit from the actuator leadscrew assembly 10. The actuator leadscrew assembly 10 provides a reduced cost and zero lash ball bearing design when compared to previous assemblies.

The actuator leadscrew assembly 10 reduces the number of components and relies only on press operations to assemble the leadscrew. In particular, the assembly 10 only requires six components and can be assembled in five steps.

Two pressed ball bearings 16, 18 are employed to assemble a metal leadscrew 12 and a housing 14. The housing 14 is formed of plastic in some embodiments. A first ball bearing 16 is pressed over the leadscrew shaft 12 and fully seated thereon. The housing 14 is then pressed onto the first ball bearing 16 such that an end of the leadscrew protrudes from an open end of the housing 14. The second ball bearing 18 is then pressed over the leadscrew shaft 12 and into the housing 14. The second ball bearing 18 is pressed until seated inside the housing 14 using a pressing process to provide the preload and zero lash condition required for stiffness. In some embodiments, the bearings 16, 18 are deep groove ball bearings, but it is to be appreciated that other bearings are contemplated.

The pressing process is controlled by a dynamically controlled press system that monitors the press load using a piezo-electric load cell system that provides feedback to the press controller to accurately deliver the desired preload. By using two self-centering bearings 16, 18, it is possible to use the housing 14 and bearing stiffness to provide the bearing preload. This is accomplished by using the above-described pressing process that allows dynamic monitoring and control of the press load. This change increases the working load and prevents the bearing preload from affecting the steering column stiffness. It also provides uniform stiffness in both direction. Pressing of the bearing package does not load the leadscrew 12 to the point of bending. This eliminates the potential of changing the audible performance.

A retaining ring 20 is assembled onto the leadscrew 12 after the second ball bearing 18 is assembled to the leadscrew 12 for crash load retention. In some embodiments, the retaining ring 20 is formed of spring steel. During a crash event, the retention function previously provided by a nut is now achieved with the retaining ring 20. Other retention methods are contemplated, such as snap rings, stakes and pinching, for example. The retaining ring is not in contact with the bearing, but if a load much greater than the operation load occurs, it will prevent steering column motion from occurring.

The disclosed assembly 10 separates crash and normal operating loads. The bearing preload method will resist motion in normal operating conditions, but is additionally reinforced by the retaining ring 20 in the event of a crash. This separation decouples the functions, allowing better consistency of the preload. As an added benefit, the preload is equal in both directions because the stiffness of the bearings 16, 18 and the housing 14 replaces a spring element. Additionally, the assembly 10 has the ability to have the preload pressed without changing the straightness of the leadscrew 12.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An actuator leadscrew assembly comprising:
   a leadscrew shaft extending longitudinally;
   a first bearing pressed over the leadscrew shaft;
   a housing pressed over the leadscrew shaft and in abutment with the first bearing;
   a second bearing pressed over the leadscrew shaft and in abutment with the housing, wherein the first bearing and the second bearing are solely axially retained during a normal operating condition with the press fit load applied between each respective bearing and the housing; and
   a retaining ring disposed over the leadscrew shaft retaining the second bearing, the retaining ring formed of spring steel and not in contact with the first bearing or the second bearing during normal operating conditions.

2. The actuator leadscrew assembly of claim 1, wherein the housing is formed of plastic.

3. The actuator leadscrew assembly of claim 1, wherein the second bearing is pressed with a dynamically controlled press system that monitors the press load using a piezoelectric load cell system.

4. The actuator leadscrew assembly of claim 1, wherein the assembly does not include a nut coupled to the leadscrew.

5. The actuator leadscrew assembly of claim 1, wherein the first bearing and the second bearing are deep groove ball bearings.

6. The actuator leadscrew assembly of claim 1, wherein the assembly is part of a steering column adjustment system.

7. The actuator leadscrew assembly of claim 6, wherein the steering column adjustment system comprises a rake adjustment system.

8. The actuator leadscrew assembly of claim 6, wherein the steering column adjustment system comprises a telescope adjustment system.

9. A vehicle steering column assembly comprising:
   a steering column adjustment system; and
   an actuator leadscrew assembly comprising:
      a leadscrew shaft extending longitudinally;
      a first bearing pressed over the leadscrew shaft;
      a housing pressed over the leadscrew shaft and in abutment with the first bearing;
      a second bearing pressed over the leadscrew shaft and in abutment with the housing, wherein the first bearing and the second bearing are solely axially retained during a normal operating condition with the press fit load applied between each respective bearing and the housing; and
      a retaining ring disposed over the leadscrew shaft retaining the second bearing, wherein the actuator leadscrew assembly does not include a nut coupled to the leadscrew, the retaining ring formed of spring steel and not in contact with the first bearing or the second bearing during normal operating conditions.

10. The vehicle steering column assembly of claim 9, wherein the steering column adjustment system comprises a rake adjustment system.

11. The vehicle steering column assembly of claim 9, wherein the steering column adjustment system comprises a telescope adjustment system.

12. The vehicle steering column assembly of claim 9, wherein the housing is formed of plastic.

* * * * *